(12) United States Patent
Lin

(10) Patent No.: US 6,353,769 B1
(45) Date of Patent: Mar. 5, 2002

(54) METHOD FOR ALLOCATING LOT PRIORITY BY RANKING LOTS AS A FUNCTION OF BUDGET QUEUE TIME IN A MANUFACTURING CONTROL SYSTEM

(75) Inventor: Kuo-Chen Lin, Hsin-Chu (TW)

(73) Assignee: Taiwan Semiconductor Manufacturing Company, Hsin-Chu (TW)

(*) Notice: Subject to any disclaimer, the term of this patent is extended or adjusted under 35 U.S.C. 154(b) by 0 days.

(21) Appl. No.: 09/274,000

(22) Filed: Mar. 22, 1999

(51) Int. Cl.[7] .............................................. G06F 19/00
(52) U.S. Cl. ......................................... 700/101; 700/99
(58) Field of Search ............................. 700/97, 99–103; 705/7–9

(56) References Cited

U.S. PATENT DOCUMENTS

| 5,128,861 A | 7/1992 | Kagami et al. | 364/403 |
| 5,319,544 A | 6/1994 | Schmerer et al. | 364/403 |
| 5,396,432 A | 3/1995 | Saka et al. | 364/468 |
| 5,446,671 A | 8/1995 | Weaver et al. | 364/468 |
| 5,546,326 A | 8/1996 | Tai et al. | 364/552 |
| 5,612,886 A | 3/1997 | Weng | 364/468.07 |
| 5,721,686 A | 2/1998 | Shahraray et al. | 364/468.08 |
| 5,751,580 A * | 5/1998 | Chi | 700/101 |
| 5,818,716 A * | 10/1998 | Chin et al. | 700/100 |

* cited by examiner

Primary Examiner—William Grant
Assistant Examiner—Steven R. Garland
(74) Attorney, Agent, or Firm—George O. Saile; Stephen B. Ackerman; Graham S. Jones, II (57) ABSTRACT

A system and a method are provided employing the concept of Budget Queue Time to define the priority of lots while distinguishing clearly between the controllable an uncontrollable portions of the remaining production time needed and to make the priority setting further meet the actual status. Two indices X and P are used concurrently to define the priority of a lot. X is the index of the delivery week which indicates the week in which the lot must be out of the fabrication process and P denotes the temporary priority according to the Budget Queue Time, but X is the dominant one of the two indices X and P. Use is made of the concept of remaining Budget Queue Time instead of traditional queue time of current stage for dispatching to reduce the variance of cycle time variance.

20 Claims, 7 Drawing Sheets

| | Same Product at Different Stages | Minimum Number of Days | X Delivery Week |
|---|---|---|---|
| Stage 4 Lot 4 | Budget_Qr=(4−0.2)/1=3.8/1=3.8 days (by Req_date)<br>Budget_Qd=(1−0.2)/1=0.8/1=0.8 days (by Due_date) | 0.8 | 1 |
| Stage 3 Lot 2 | Budget_Qr=(2−0.4)/2=1.6/2=0.8 days (by Req_date)<br>Budget_Qd=(2−0.4)/2=1.6/2=0.8 days (by Due_date) | 0.8 | 2 |
| Stage 2 Lot 3 | Budget_Qr=(3−0.6)/3=2.4/3=0.8 days (by Req_date)<br>Budget_Qd=(3−0.6)/3=2.4/3=0.8 days (by Due_date) | 0.8 | 3 |
| Stage 1 Lot 1 | Budget_Qr=(1−0.8)/4=0.2/4=0.05 days (by Req_date)<br>Budget_Qd=(4−0.8)/4=3.2/4=0.8 days (by Due_date) | 0.05 | D |

*FIG. 7B*

METHOD FOR ALLOCATING LOT PRIORITY BY RANKING LOTS AS A FUNCTION OF BUDGET QUEUE TIME IN A MANUFACTURING CONTROL SYSTEM

BACKGROUND OF THE INVENTION

1. Field of the Invention

This invention relates to allocation of priority of lots of work to processing in a factory and more particularly to ranking of lots to determine their priority.

2. Description of Related Art

U.S. Pat. No. 5,319,544 of Schmerer et al. for "Computerized Inventory Monitoring and Verification System and Method"; U.S. Pat. No. 5,128,861 of Kagami et al. for "Inventory Control Method and System"; and U.S. Pat. No. 5,396,432 of Saka et al. for "Versatile Production System and Method of Operating Same" show production systems.

U.S. Pat. No. 5,446,671 of Weaver et al. for "Look-Ahead Method for Maintaining Optimum Queued Quantities of In-Process Parts at a Manufacturing Bottleneck" shows a production system.

U.S. Pat. No. 5,546,326 of Tai et al. for "Dynamic Dispatching Rule that Uses Long Term Due Date and Short Term Queue Time to Improve Delivery Performance"; U.S. Pat. No. 5,612,866 of Weng for "Method and System for Dynamic Dispatching in Semiconductor Manufacturing Plants"; and U.S. Pat. No. 5,721,686 of Shahraray et al. for "Method and Apparatus for Control and Evaluation of Jobs in a Factory" show scheduling systems.

SUMMARY OF THE INVENTION

GLOSSARY

Budget_Q . . . Budget Queue Time or BQT
BR . . . Base Rate
Critical Ratio.C/R: Critical Ratio Degree of Customer Dissatisfaction
$C_{tR}$ . . . BT (Budget Time) according to Required Date of lot
$C_{tD}$ . . . BT (Budget Time) by the Due Date of lot
$C_{tqR}$ . . . Budget_Q (BQT) according to Required Date of lot
$C_{tqD}$ . . . Budget_Q (BQT) by Due Date of lot
$C_{tl}$ . . . Step Budget_Q (BQT) for Lot Lm, Ln, etc.
CT . . . Cycle Time
Due_Date . . . Scheduled Due Date from MPS, i.e. date when processing of a lot must be finished for an order placed on MPS.
Due_Date_Now . . . Current Scheduled Due Date
FAB . . . Fabrication plant
FFOT . . . Forecast_FAB_Out_Time
Finished out . . . Completed the manufacturing process
MTD . . . Month To Date
MTD_OUT . . . Month To Date wafers OUT of FAB
MPS . . . Master Production Schedule
OTD . . . On-Time-Delivery
P . . . Temporary priority (P value) according to BQT
RP . . . Remaining Theoretical Recipe Processing Time
RD . . . (Required Date) Date when a lot must be finished out according to start date and average past cycle time data.
SLACK . . . Due_Date_Now—FFOT
Least SLACK . . . Lot with least amount of SLACK
$t_p$ . . . time from current step to finished step
$t_{sp}$ . . . Process time from step s from to p (process): Recipe time (process time) by step by product
$\Sigma t_{sp}$ . . . Remaining theoretical process time equal to sum of $t_p$ from current step to finished step.
T . . . Time
WIP . . . Work in Process
X . . . Index for Week when lot must be Delivered i.e. Lot is Required to be out of FAB The required cycle time is based on PC Lot's RD definition based on the FIFO principle.

PROBLEM SOLVED BY INVENTION

Two of the indices most commonly used for setting lot priorities are least SLACK and the critical ratio (C/R). These two indices are used to dispatch with the aim of meeting or improving OTD. However, the values of SLACK or C/R sometimes cannot reflect the actual urgent status of a lot due to the variances of the uncontrollable portion of the remaining Cycle Time (CT), i.e. the remaining recipe processing time between different products. Thus, only after the processing time is deducted while calculating the remaining time, is it possible to define the urgency or the priority of lots clearly. There are two kinds of dates/times when a lot should have completed processing, which are the Required Date (RD) and the Due_Date. The RD denotes the delivery requirement and the Due_Date indicates the shorter cycle time deviation. In practice, the two values, i.e. (the RD and the Due_Date) can be combined together and integrated into a date for calculating the remaining CT. While the combination of the two dates is a convenience; it can lead an operator to be confused by the two different concepts of delivery time and CT variance when evaluating the priority to be assigned to a given lot.

Problems solved and improvements obtained by this invention include the features as follows:

1. With the index of X, the lots are pushed more correctly for delivery especially for the back end stages.
2. With the index of P, the lots are moved according to the remaining Budget Queue Time. This makes lots finished out with little variance.
3. With the distinguishability between delivery and cycle time variance of lots by two parameters of (X,P), the analysis of delivery and variance of the whole line is made easily. Production planners benefit greatly as they are able to make scheduling decisions resolving conflicts arising upon conflicting customer requirements.

The concept of Budget Queue Time is used to define the priority of lots while distinguishing clearly between the controllable an uncontrollable portions of the remaining production time needed and to make the priority setting further meet the actual status. Two indices X and P are used concurrently to define the priority of a lot. X is the index of the delivery week which indicates the week in which the lot must be out of the fabrication process and P denotes the temporary priority according to the Budget Queue Time, but X is the dominant one of the two indices X and P. Use is made of the concept of remaining Budget Queue Time instead of traditional queue time of current stage for dispatching to reduce the variance of cycle time variance.

BRIEF DESCRIPTION OF THE DRAWINGS

The foregoing and other aspects and advantages of this invention are explained and described below with reference to the accompanying drawings, in which.

DESCRIPTION OF THE PREFERRED EMBODIMENT

FIGS. 1, 2, 3 and 4 are flow charts showing the steps of a method of operation of a production control system in accordance with the method and apparatus this invention. The computer programs of FIGS. 1, 2, 3 and 4 in accordance with this invention are resident in a fabrication plant computer system 70 which is shown in FIG. 5 connected as a part of the overall computer system 50. FIG. 5 shows a manufacturing plant 50 including a central computer system 60 and a fabrication plant 90 which includes a computer system 70 for allocating plant resources using budget queue time measurements for allocating priorities to lots of work to be processed in accordance with this invention.

1. Calculation of Budget Q for Lots Lm, Ln, etc. at Each Step

Figure 1:
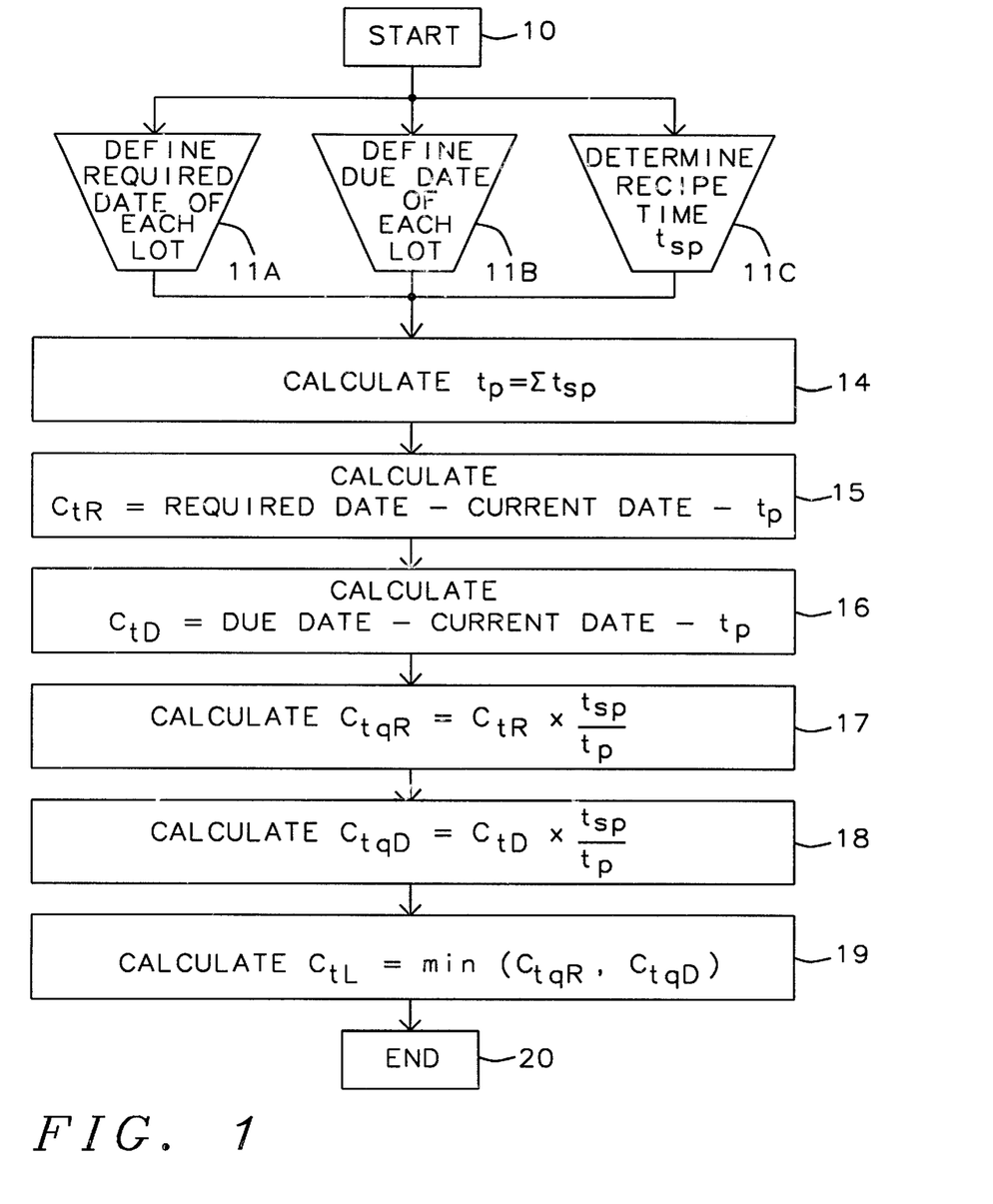
FIGS. 1, 2, 3 and 4 are computer flow charts showing the steps of a method of operation of a production control system in accordance with the method and apparatus this invention.

FIG. 1 is a flow chart in block diagram form with steps shown in separate blocks illustrating a method of operating the computer system 50 of FIG. 5 to calculate the Budget_Q for all Lots Lm, Ln, etc. included in the in-line WIP at each step.

The first three blocks involve definition and determination of data being supplied or which has been supplied to the CPU 71. Those sets of data are stored by the system 70 in data input blocks 11A, 11B and 11C after definition and determination of the dates and time as described below.

In two of those blocks required in order to calculate the Budget Queue Time and to consider the delivery and cycle time variance also, it is required, as a preliminary matter, to define the RD when a lot Lm, Ln, etc. is completed (finished out) in block 11A and the due dates of lots Lm, Ln, etc. in block 11B, as indicated by FIG. 1.

In block 11A, the RD's of the lots Lm, Ln, etc. to be processed by plant 90 are defined. The RD's are the dates when a lot must be "finished out" according to the start date and the average cycle time data of the past.

In block 11B, data defining the Due_Dates of the lots Lm, Ln, etc. to be processed by plant 90 are defined. Due_Dates are dates scheduled from the Master Production Schedule (MPS), i.e. the date when processing of one of the lots Lm, Ln, etc. must be finished in an order placed on the MPS.

In block 11C, the recipe time "$t_{sp}$" is determined for the process steps to be performed by plant 90. The processing time of each step for each product is derived by the data determined from the production personnel and is defined as:

$t_{sp}$=Recipe time (process time), where s=step and p=process

The total Budget Queue Time for all remaining processing steps of a lot is calculated according the RD and due date individually and by deducting the remaining processing time (the uncontrollable portion of cycle time) from the remaining determined cycle time. And those parameters are defined as follows:

$C_{tR}$=step Budget Time according to the RD of lot.
$C_{tD}$=step Budget Time according to the Due Date of Lot.
$t_p$ is the time from the current step to the finished step.
$\Sigma t_{sp}$ is the remaining theoretical process time.

The above parameters are calculated in accordance with the equations as follows:

1.1 $t_p = \Sigma t_{sp}$ Remaining theoretical process time=
1.2 $C_{tR}$=(RD date−current date−tp)
1.3 $C_{tD}$=(Due_Date−current date−tp) and defined as follows:

$C_{tqR}$ is the step budget_Q time by the RD.
$C_{tqD}$ is the step budget_Q time by the Due_Date.
$C_{tt}$ is the step budget_Q time of the lot Lm, Ln, etc.

$$C_{tqR} = C_{tR} \times \frac{t_{sp}}{t_p} \qquad 1.4$$

$$C_{tqD} = C_{tD} \times \frac{t_{sp}}{t_p} \qquad 1.5$$

1.6 $C_{tt}$=min ($C_{tqR}$, $C_{tqD}$)

Figure 2:
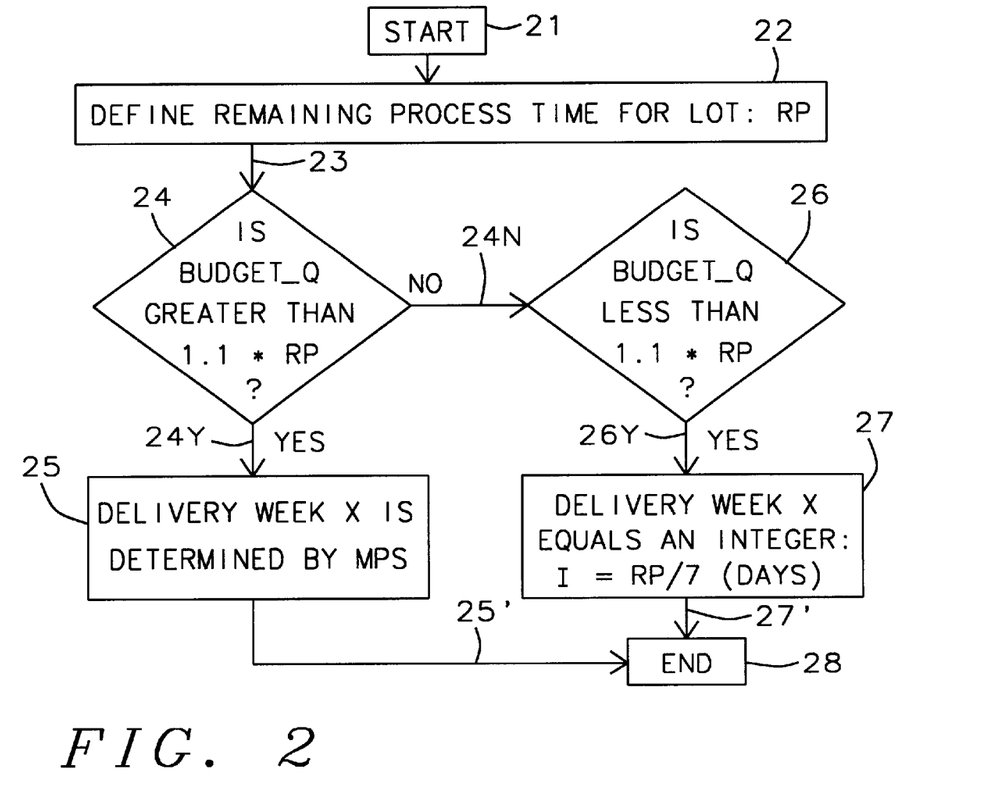

2. Compare Budget_Q for the Lot Lm for the Same Product at Different Stages and through the Budget_Q to Determine the Index X where X representing the week when the lot is required to be delivered, i.e. out of the FAB by an integer One of the CPUs (Central Processing Units) 61 or 71 is selected by the user to perform the function of defining the Integer X based on a comparison of Budget_Q with RP (Remaining Theoretical Recipe Processing Time) for a lot.

2.1 If lot's budget_Q>1.1*RP, then X is determined by MPS.

2.2 If lot's budget_Q <1.1*RP, then X is determined by the integer I where $$I = \frac{RP}{7 \text{ days}}$$

3. Setting Temporary Priority P According to Budget Queue Time

Figure 3:
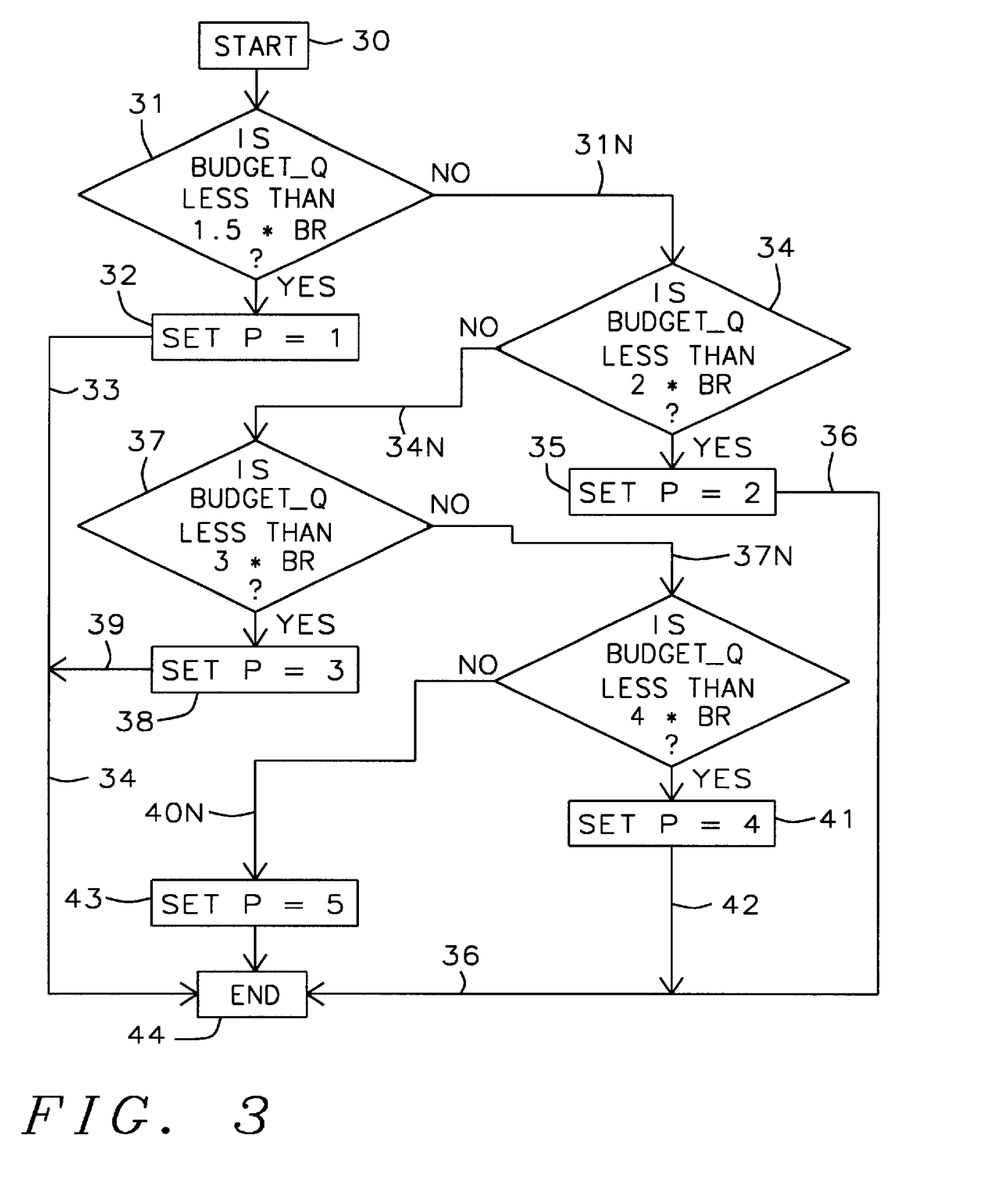

FIG. 3 is a flow chart in block diagram form with steps shown in separate blocks illustrating a method of operating the computer system 50 of FIG. 5 to set the temporary priority P value using only the Budget Queue Time as a measurement. The method of operating the computer system 50 only according to Budget Queue Time involves the steps, starting with block 30, as follows:

3.1. A test is made in decision block 31 as to whether Budget_Q<1.5*BR.

If the result of the test in decision block 31, is YES, then the system proceeds to block 32 in which the priority value P for the lot is set as P=1. Then the system proceeds along lines 33 and 34 to END block 44, which ends the program.

If the result of the test in decision block 31 is NO, then the system proceeds along line 31N to decision block 34.

3.2. The next test is made in decision block 34 as to whether Budget_Q<2*BR.

3.2.1 If the result of the test in decision block 34 is YES, then the system proceeds to block 35 in which the priority value P for the lot is set as P=2. Then the system proceeds along line 36 to END block 44, which ends the program.

3.2.2 If the result of the test in decision block 34 is NO, then the system proceeds along line 34N to decision block 37.

3.3. The next test is made in decision block 34 as to whether Budget_Q<3*BR.

3.3.1 If the result of the test in decision block 37, is YES, then the system proceeds to block 38 in which the priority value P for the lot is set as P=3. Then the system proceeds along lines 39 and 34 to END block 44, which ends the program.

3.3.2 If the result of the test in decision block 37 is NO, then the system proceeds along line 37N to decision block 40.

3.4 The next test is made in decision block 40 as to whether Budget_Q<4*BR.

3.4.1 If the result of the test in decision block 40 is YES, then the system proceeds to block 41 in which the priority value P for the lot is set as P=4. Then the system proceeds along lines 42 and 36 to END block 44, which ends the program.

3.5 If the result of the test in decision block 34 is NO, then the system proceeds along line 40N to block 37 in which the priority value P for the lot is set as P=5.

Then the system proceeds along lines 42 and 36 to END block 44, which ends the program.

All lots which have priority values P of 1, 2, or 3 will meet the requirements as follows:

a. Normal production lots 1.9 days per lot;

b. Super hot lots 0.7 days per lot;

c. Hot lot or/Pilot lot 0.9 days per lot.

4. Dispatching Rules

Figure 4:
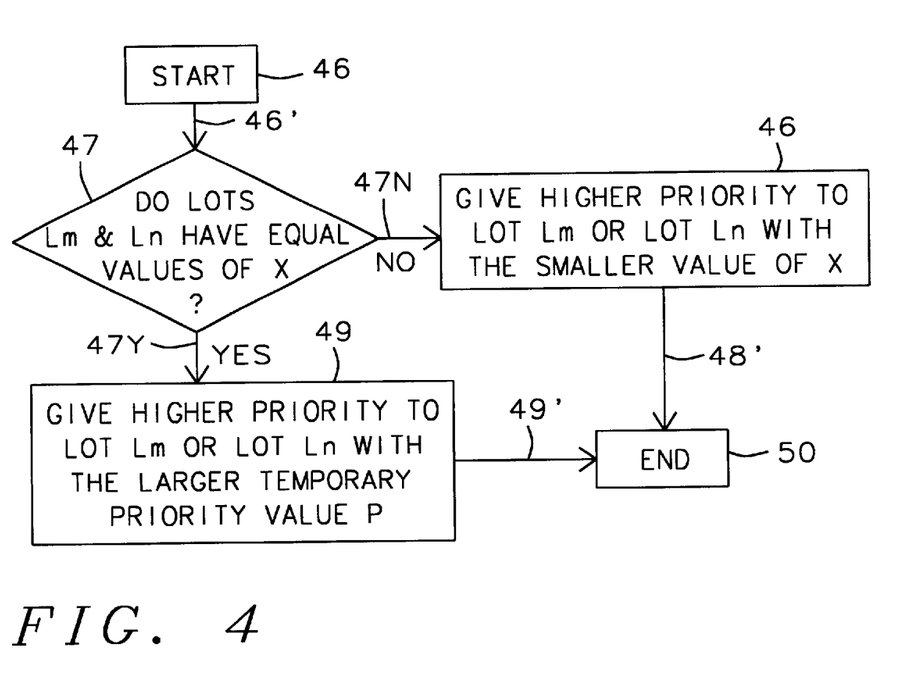
Figure 5:
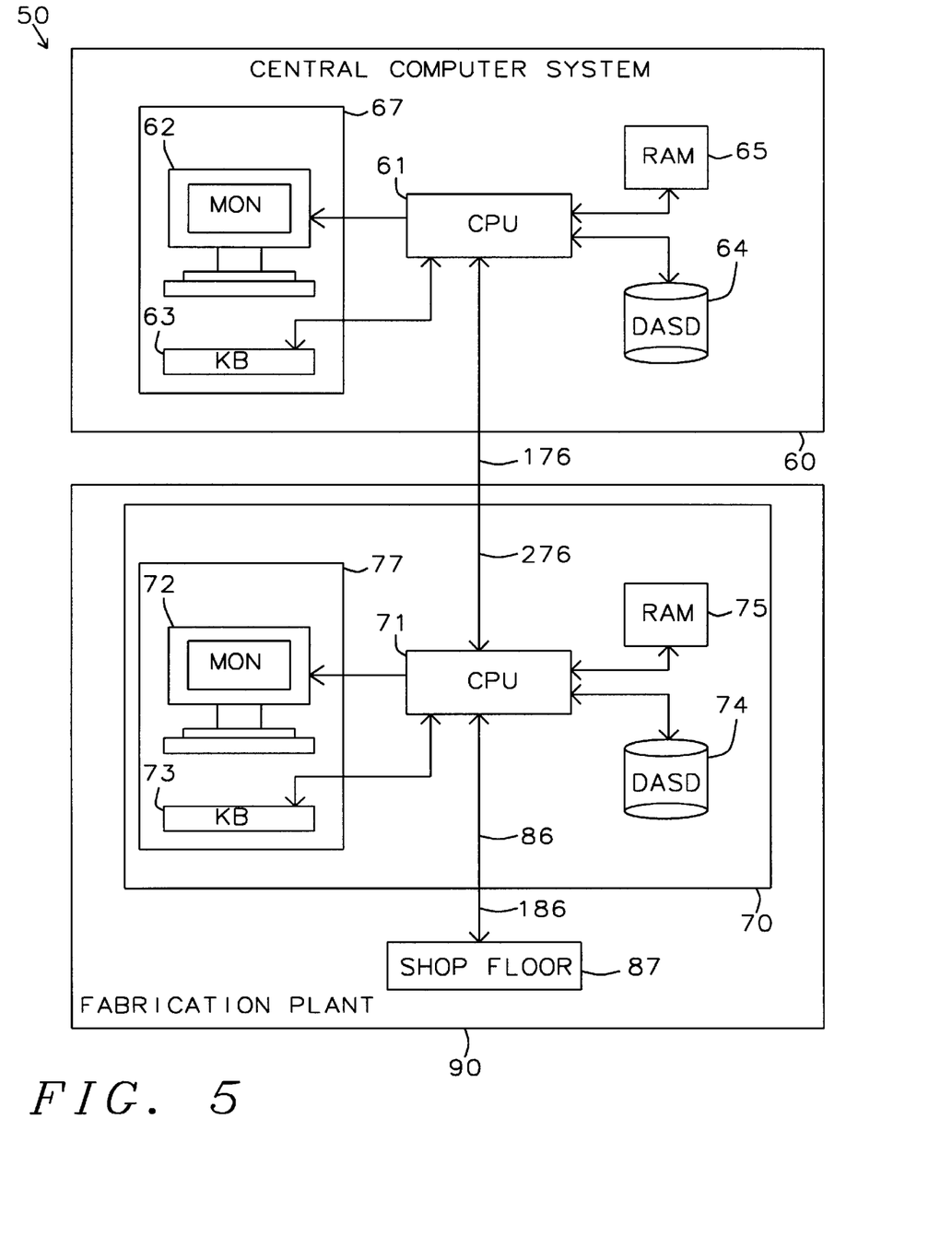
FIG. 5 shows a manufacturing plant including a central computer system and a fabrication plant which includes a computer system for allocating plant resources using budget queue time measurements for allocating priorities to lots of work to be processed in accordance with this invention.

FIG. 4 is a flow chart in block diagram form with steps shown in separate blocks illustrates a method of operating the computer system 50 of FIG. 5 for dispatching when lots Lm and Ln which are being processed at the same time, i.e. simultaneously, are in competition for the same capacity. In accordance with this invention, the processing priorities are set according to a set of rules. The method of operating the computer system 50 for dispatching involves the steps, starting with block 46, as follows:

4.1. A test is made in decision block 47 as to whether the X values (Index of the Delivery Week in which the lot must be out of the FAB) of lots Lm and Ln are different.

If the result of the test in decision block 47, is NO, then the system proceeds along line 47N to block 48 in which the a higher priority "P" is given to the Lot Lm or Ln with the smaller value of X.

Then, the system proceeds along lines 48' to END block 50, which ends the dispatching rules program for the lots Lm and Ln.

4.2 If on the other hand the result of the test in decision block 47 is YES the X values of lots Lm and Ln are equal, then the system proceeds along line 47Y to block 48 which gives a higher priority P to Lot Lm or Ln with the higher value P (temporary value P). Then, the system proceeds along lines 49' to END block 50, which ends the dispatching rules program for the lots Lm and Ln.

5. Effect and Improvement of Reducing Cycle Time Variance

Use the new Budget_Q instead of conventional q-time that will induce a convergence result with little variance of delivery time.

Referring again to FIG. 5, computer system 70 operates as a part of a fabrication plant 90 and so it is shown located within the plant 90, but it may be located elsewhere as will be obvious to those skilled in the art and it can be a portion of an overall consolidated system incorporating the central system 60 and can operate independently as a matter of choice.

FIG. 5 also shows an overall computer system 50 employed in a manufacturing environment. System 50 includes a central computer system 60 which comprises a CPU (Central Processing Unit) 61, a terminal 67 with monitor 62 and keyboard 63 connected to the CPU 61 for receiving/sending data respectively from/to the CPU 61. A RAM (Random Access Memory) 65 and a DASD 64 associated with the CPU 61 are shown connected for bidirectional communication of data to and from CPU 61.

Lines 76, 176 and 276 interconnect the CPU 61 and the CPU 71 of a fabrication plant computer system 70. Line 176 connects between lines 76 and 276 at the interfaces of computer 60 and a factory control computer system 70 respectively.

The factory control computer system 70 comprises a CPU 71, a terminal 77 with monitor 72 and keyboard 73 connected to the CPU 71 for receiving/sending data respectively from/to the CPU 71. A random access memory 75 and a DASD 74 associated with the CPU 71 are shown connected for bidirectional communication of data to and from CPU 71.

Line 86 connects from CPU 71 to line 186 connects through the factory control computer 70 interface to the shop floor system 87.

The system 50 includes the data defining the Master Production Schedule for the plant 90 stored in a conventional manner, as will be well understood by those skilled in the art.

Figure 6:
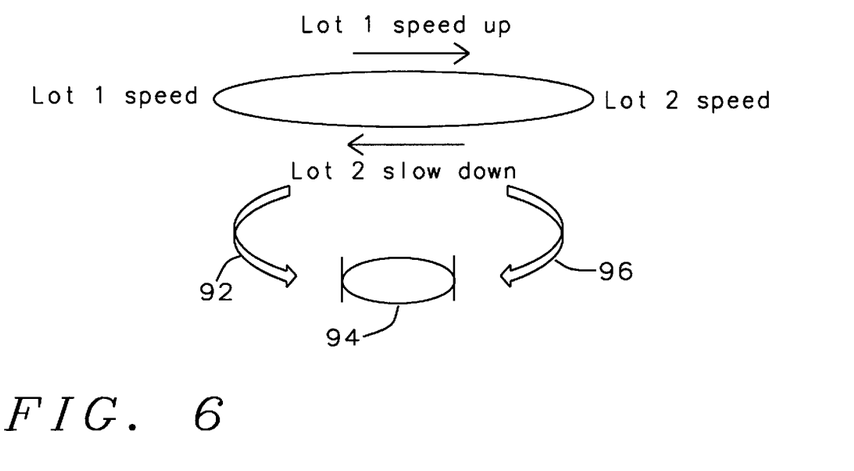
FIG. 6 is an example of two lots being processed according to the method of this invention. In the case of one lot, the processing speed of the lot is increased and in the case of another lot the processing speed of the lot is slowed down.

FIG. 6 illustrates an example of two lots being processed in accordance with the method of this invention. In the case of one lot, the speed of processing that lot is increased and in the case of another lot the speed of processing that lot is slowed down.

In particular, referring again to FIG. 6, in the case of Lot 1, the speed of processing that lot is increased and in the case of Lot 2 the speed of processing that Lot 2 is slowed down.

6. Critical Difference and Benefit Compared with the Past

"Budget_Q" is used to produce "Lot XP" and to use the delivery week—X instead of conventional "Lot P" to narrow the focus on the right lot to be delivered at the same stage.

A lot with a scheduled delivery week in week one (1) and with a priority of five (5) should be run faster than a lot with a scheduled delivery week in week two (2) with priority of one (1) at the same stage. Through use of this concept, the capacity will be used exactly to the maximum.

A "Budget_Q is provided for each process step in place of the conventional step Q_time to become a "dispatching driver" which can provide a convergence result of both dispatching lots and making a critical difference in "On-time-delivery" (OTD) with a little variance in production cycle time CT among all wafers passing out of the fabrication facility.

EXAMPLE

Modeling for a Single Product

Figure 7A:
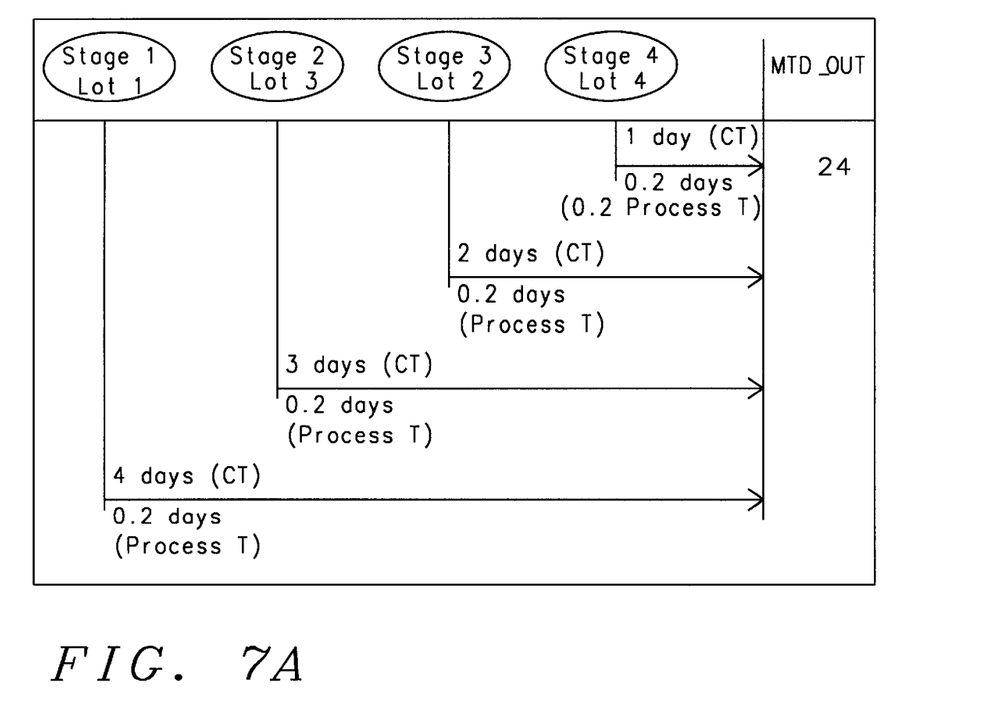
FIG. 7A shows a table for four stages and four different lots of the same product in different stages.
Figure 7B:
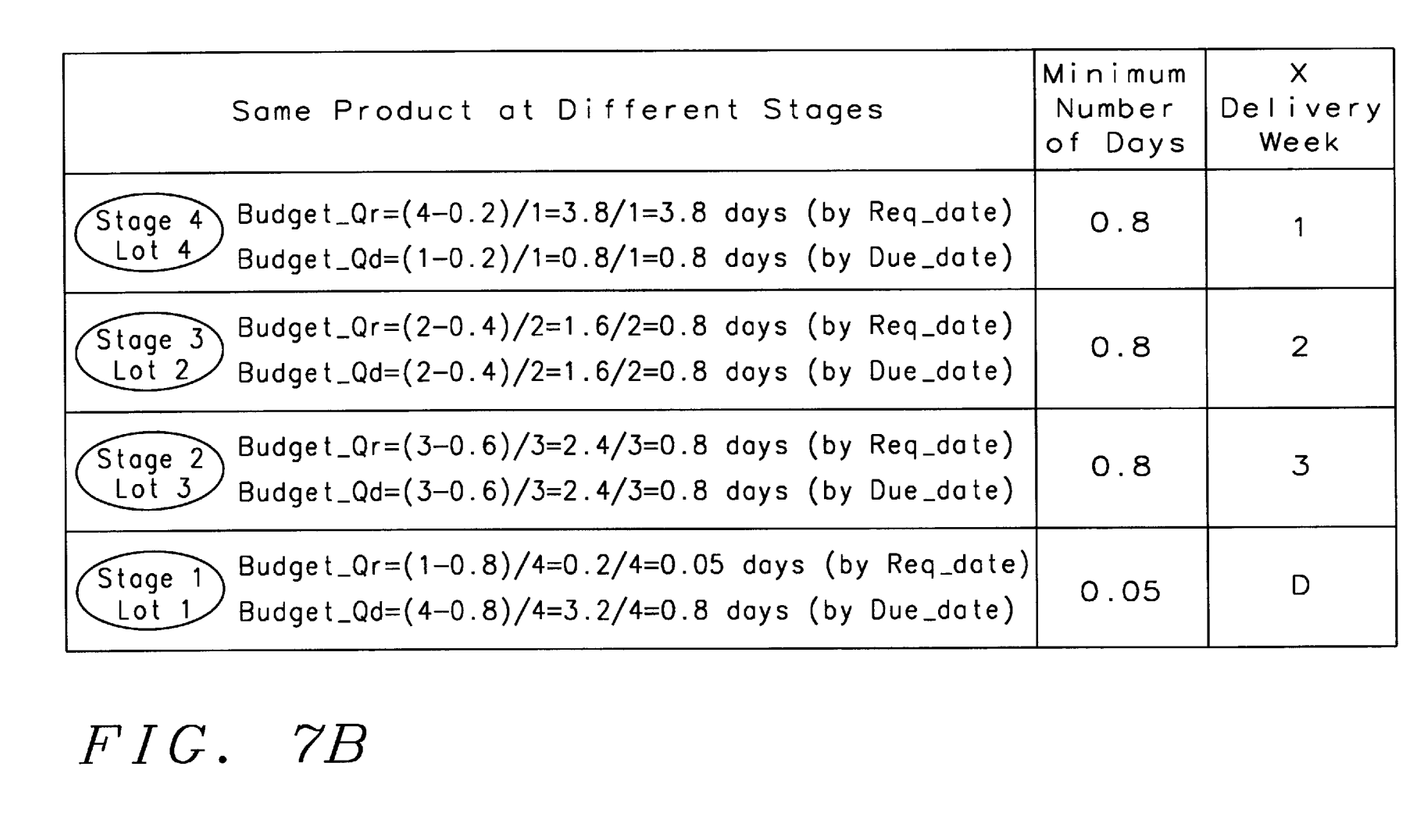
FIG. 7B shows a table related to the table of FIG. 7A for the four stages and four different lots of the same product in different stages indicating the values of the minimum number of days and the delivery week X.

Referring to FIGS. 7A and 7B, to define the delivery week for a lot a chart is shown for the same product at different stages as indicated in the table below, as well. Referring to both FIGS. 7A and 7B the assumptions are as follows:

1. Size of Lot=24 pieces

2. Output Target=72 pieces

3. Exclude all hold lots

The table shown in FIG. 7A shows four stages from stage 1 to stage 4 with lot 1 at stage 1, lot 3 at stage 2, lot 2 at stage 3 and lot 4 at stage 4.

a. For Stage 1, lot 1 the cycle time (CT) is 4 days and the process time (T) is 0.2 days.

b. For Stage 2, lot 3 the cycle time (CT) is 3 days and again the process time (T) is 0.2 days.

c. For Stage 3, lot 2 the cycle time (CT) is 2 days and once again, the process time (T) is 0.2 days.

d. For Stage 4, lot 4 the cycle time (CT) is only 1 day and the process time (T) remains as 0.2 days CT: Cycle Time Process T: Processing Time (Month To Date) MTD_OUT 24 1 day(CT) (0.2 Process T)

The customer would need Lot 4 and Lot 2 to get the required quantity 72 pieces, but the customer would complain about the variance between the cycle time CT1 of Lot 1 and cycle time CT4 of Lot 4, unless the present invention can make up "SLACK" of Lot 1.

FIG. 7B shows a table defining the delivery week of a lot is shown for four exemplary lots of the same product for the four stages (1–4) and four different lots of the same product in different stages indicating the values of the minimum number of days and the delivery week X.

1 Lot Budget_Q=Min (Budget_Qr, Budget_Qd)
2 D=Integer (Remaining theoretical Process Time/7 (days))
3 If Lot Budget_Q<1.1 x Budget
4 Modeling for Multiple products at the same Stage
5 To Define the lots' priority (Excluding all held lots)

TABLE I

| Product | Remaining Process time (days) | Remaining Steps | 1.5 Budget_Q_time (hrs) | 2× Budget_Q_time (hrs) | 2.5 Budget_Q_time (hrs) | 3× Budget_Q_time (hrs) |
|---|---|---|---|---|---|---|
| P1 | 12.2 | 148 | 0.99 | 1.98 | 2.97 | 3.96 |
| P2 | 11.3 | 142 | 0.95 | 1.91 | 2.86 | 3.82 |
| P3 | 13 | 156 | 1.00 | 2.00 | 3.00 | 4.00 |
| P4 | 14.1 | 168 | 1.01 | 2.01 | 3.02 | 4.03 |

Required Budget_Q = (Remaining days)

$$= \frac{Req\_date - Today) - Remaining\ Process\ time)}{Remaining\ Steps}$$

Due Budget_Q = (Remaining days)

$$= \frac{(Due\_date - Today) - Remaining\ Process\ time}{Remaining\ Steps}$$

Min Px (Required Budget_Q, Due Budget_Q) =Px Budget_Q

Modeling for Multiple products at the same Stage

Assumption: Normal production lot 1.9 days per layer
  Fab 6 1st lot 0.35 days per layer (Priority 1)
  Super hot lot 0.7 days per layer (Priority 1
  Hot/Pilot lot 0.9 days per layer (Priority 1

Priority settings will focus on "Normal production lots" and exclude all held lots.

Priority Distribution is Based on the Budget_Q of each lot under different levels of X.

TABLE II

| | Theoretical Process time | | | | |
|---|---|---|---|---|---|
| | | | Priority | | |
| Budget_Q ($C_{tl}$) | 1 | 2 | 3 | 4 | 5 |
| <1.5X | 1 | | | | |
| 1.5X < CT < 2.5X | | 2 | | | |
| 2.5X < CT < 3X | | | 3 | | |
| 3X < CT < 4X | | | | 4 | |
| >4X | | | | | 5 |

LOT XP

Definition of the Delivery Week X

When the normal lots are selected with over 1.1* (theoretical Budget_Q), then follow the PC MPS schedule to define the value of delivery week X for the lots. If the delivery week for the lots is less than 1.1*Budget_Q, then in accordance with this invention, the delivery week X is redefined.

$$D = \frac{Integer\ (Remaining\ theoretical\ process\ time)}{7\ (days)}$$

$t_{sp}$ = Recipe time (process time)

$s$: step $p$: process

The time $t_{sp}$ is by step.

$C_{tR}$=Required cycle time (based on PC Lot's required date definition—FIFO principle)

$C_{td}$=Due-date cycle time
  This is based on actual Lot's due-date to meet MPS volume demand.

$$t_p = \sum t_{sp}$$

$t_{sp}$: Remaining theoretical process time $t_p$: process time from current step to finished step $C_{tqR}$: Budget_Q time by required-date $$C_{tqR} = \frac{C_{tR} \times t_{sp}}{t_p}$$

$C_{tqD}$: Budget_Q time by due_date $$C_{tqD} = \frac{C_{td} \times t_{sp}}{t_p}$$

$C_{tl}$: Lot's step Budget_Q-time
$C_{tl}$=min ($C_{tqR}$, $C_{tqD}$)
$C_{tl}$ is to be used as a priority definition factor of a lot for table III above.

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly all such changes come within the purview of the present invention and the invention encompasses the subject matter of the claims which follow.

having thus described the invention, what is claimed as new and desirable to be secured by Letters Patent is as follows:

1. A method for assigning priority to lots in the process of manufacturing of a product comprising:
    calculating budget queue time (Budget_Q) of the lots at each step of a manufacturing plant,
    comparing the Budget_Q for a lot for the same product at different stages and through the use of the budget queue time to define delivery week X,
    setting a temporary priority (P) according to Budget_Q only, and
    determining priority of lots competing for identical capacity.

2. A method in accordance with claim 1 including:
    calculating $C_{tqR}$=required_date step Budget_Q,
    calculating $C_{tqD}$=due_date step Budget_Q, and
    calculating Budget_Q as the minimum of $C_{tqR}$, $C_{tqD}$, min ($C_{tqR}$, $C_{tqD}$).

3. A method in accordance with claim 1 including:
    a Master Production Schedule (MPS)
        determine RP (Remaining Theoretical Recipe Processing Time of a lot)

$$\text{determine an integer } I = \frac{RP}{7 \text{ days}}$$

if, for a lot, Budget_Q>1.1*RP, then the delivery week X is determined by the Master Production Schedule (MPS), and
    if, for a lot, Budget_Q<1.1*RP, then the delivery week X is determined by integer I.

4. A method in accordance with claim 1 including, wherein there is a Base Rate (BR), setting temporary priority P as follows:
    if Budget_Q<1.5*BR, then P=1,
    if Budget_Q<2*BR, then P=2,
    if Budget_Q<3*BR, then P=3,
    if Budget_Q<4*BR, then P=4, and
    if Budget_Q>4*BR, then P=5.

5. A method in accordance with claim 1 including:
    if values of the delivery week X are different, then the lot with a smaller value of X gets a higher priority,
    if values of the delivery week X are equal, then the lot with a larger value of temporary priority P gets the higher priority.

6. A method in accordance with claim 1 including:
    $C_{tqR}$=required$_{13}$ date step Budget_Q is calculated,
    $C_{tqD}$=due_date step Budget_Q is calculated, and
    Budget_Q is calculated as the minimum of $C_{tqR}$, $C_{tqD}$, min ($C_{tqR}$, $C_{tqD}$), and
    Remaining Process time RP of a lot is determined, $$\text{an integer } I = \frac{RP}{7},$$

if, for a lot, Budget_Q>1.1*RP, then the delivery week X is determined by a Master Production Schedule (MPS), and
    if, for a lot, Budget_Q<1.1*RP, then the delivery week X is determined by the integer I.

7. A method in accordance with claim 1 wherein there is a Base Rate (BR), including:
    $C_{tqR}$=required_date step Budget_Q is calculated,
    $C_{tqD}$=due_date step Budget_Q is calculated, and
    Budget_Q is calculated as the minimum of $C_{tqR}$, $C_{tqD}$, min ($C_{tqR}$, $C_{tqD}$),
    Remaining Process time RP of a lot is determined, $$\text{an integer } I = \frac{RP}{7},$$

if, for a lot, Budget_Q>1.1*RP, then the delivery week X is determined by a Master Production Schedule (MPS), and
    if, for a lot, Budget_Q<1.1*RP, then the delivery week X is determined by the integer I, and setting temporary priority P as follows:
        if Budget_Q<1.5*BR, then P=1,
        if Budget_Q<2*BR, then P=2,
        if Budget_Q<3*BR, then P=3,
        if Budget_Q<4*BR, then P=4, and
        if Budget_Q>4*BR, then P=5.

8. A method in accordance with claim 1, wherein there is a Base Rate (BR), including:
    Remaining Process time RP of a lot is determined, $$\text{an integer } I = \frac{RP}{7},$$

if, for a lot, Budget_Q>1.1*RP, then the delivery week X is determined by a Master Production Schedule (MPS), and
    if, for a lot, Budget_Q<1.1*RP, then the delivery week X is determined by the integer I, and setting temporary priority P as follows:
        if Budget_Q<1.5*BR, then P=1,
        if Budget_Q<2*BR, then P=2,
        if Budget_Q<3*BR, then P=3,
        if Budget_Q<4*BR, then P=4, and
        if Budget_Q>4*BR, then P=5.

9. A method in accordance with claim 1 including:
    $C_{tqR}$=required_date step Budget_Q is calculated,
    $C_{tqD}$=due_date step Budget_Q is calculated, and
    Budget_Q is calculated as the minimum of $C_{tqR}$, $C_{tqD}$, min ($C_{tqR}$, $C_{tqD}$), and
        setting temporary priority P as follows:
            if Budget_Q<1.5*BR, then P=1,
            if Budget_Q<2*BR, then P=2,
            if Budget_Q<3*BR, then P=3,
            if Budget_Q<4*BR, then P=4, and
            if Budget_Q>4*BR, then P=5.

10. A method for assigning priority to lots in the manufacturing of a product, wherein there is a Base Rate (BR), comprising:
    calculating budget queue time (Budget_Q) of the lots at each step of a manufacturing plant,
    comparing the Budget_Q for a lot for a product at different stages and through the use of the budget queue time to define delivery week X,
    set a temporary priority (P) according to Budget_Q only,
    determine priority of lots competing for identical capacity,
    $C_{tqR}$=required_date step Budget_Q is calculated,
    $C_{tqD}$=due_date step Budget_Q is calculated, and
    Budget_Q is calculated as the minimum of $C_{tqR}$, $C_{tqD}$, min ($C_{tqR}$, $C_{tqD}$), Remaining Process time RP of a lot is determined, $$\text{an integer } I = \frac{RP}{7},$$

if, for a lot, Budget_Q>1.1*RP, then the delivery week X is determined by a Master Production Schedule (MPS), and if, for a lot, Budget_Q<1.1*RP, then the delivery week X is determined by the integer I, and setting temporary priority P as follows:
if Budget_Q<1.5*BR, then P=1,
if Budget_Q<2*BR, then P=2,
if Budget_Q<3*BR, then P=3,
if Budget_Q<4*BR, then P=4, and
if Budget_Q>4*BR, then P=5.

11. A system for assigning priority to lots in the manufacturing of a product comprising:

means for calculating budget queue time (Budget_Q) of the lots at each step of a manufacturing plant, means for comparing the Budget_Q for a lot for a product at different stages and through the use of the budget queue time to define the delivery week X, means for setting a temporary priority (P) according to Budget_Q only, and means for determining the priority of lots competing for identical capacity.

12. A system in accordance with claim 11 including:

means for calculating $C_{tqR}$=required_date step Budget_Q, means for calculating $C_{tqD}$=due_date step Budget_Q, and means for calculating Budget_Q as the minimum of $C_{tqR}$, $C_{tqD}$ as min ($C_{tqR}$, $C_{tqD}$).

13. A system in accordance with claim 11 wherein:

means for determining Remaining Process time RP of a lot, $$\text{an integer } I = \frac{RP}{7},$$

means for determining that if, for a lot, Budget_Q>1.1*RP, then the delivery week X is determined by a Master Production Schedule (MPS), and if, for a lot, Budget_Q<1.1*RP, then the delivery week X is determined by the integer I.

14. A system in accordance with claim 11 wherein:

means is provided for setting temporary priority P as follows:
if Budget_Q<1.5*BR, then P=1,
if Budget_Q<2*BR, then P=2,
if Budget_Q<3*BR, then P=3,
if Budget_Q<4*BR, then P=4, and
if Budget_Q>4*BR, then P=5.

15. A system in accordance with claim 11 wherein:

means for determining that if the values of delivery week X are different, then the lot with a smaller value of X gets a higher priority, and means for determining that if the values of delivery week X are equal, then the lot with a larger value of temporary priority P gets the higher priority.

16. A system in accordance with claim 11 wherein:

means for calculating $C_{tqR}$=required_date step Budget_Q, means for calculating $C_{tqD}$=due_date step Budget_Q, and means for calculating Budget_Q as the minimum of $C_{tqR}$, $C_{tqD}$ as min ($C_{tqR}$, $C_{tqD}$), means for determining Remaining Process time RP of a lot, means for determining integer I equals RP/7, means for determining that
 a) if, for a lot, Budget_Q>1.1*RP, then the delivery week X is determined by a Master Production Schedule (MPS), and
 b) if, for a lot, Budget_Q<1.1*RP, then the delivery week X is determined by the integer I.

17. A system in accordance with claim 11, wherein there is a Base Rate (BR), comprising:

$C_{tqR}$=required_date step Budget_Q is calculated, $C_{tqD}$=due_date step Budget_Q is calculated, and Budget_Q is calculated as the minimum of $C_{tqR}$, $C_{tqD}$, min ($C_{tqR}$, $C_{tqD}$)

the Remaining Process time RP of a lot is determined, $$\text{an integer } I = \frac{RP}{7},$$

if, for a lot, Budget_Q>1.1*RP, then the delivery week X is determined by a Master Production Schedule (MPS), and if, for a lot, Budget_Q<1.1*RP, then the delivery week X is determined by the integer I, and means is provided for setting temporary priority P as follows:
if Budget_Q<1.5*BR, then P=1,
if Budget_Q<2*BR, then P=2,
if Budget_Q<3*BR, then P=3,
if Budget_Q<4*BR, then P=4, and
if Budget_Q>4*BR, then P=5.

18. A system in accordance with claim 11, wherein there is a Base Rate (BR), comprising:

the Remaining Process time RP of a lot is determined, $$\text{an integer } I = \frac{RP}{7},$$

if, for a lot, Budget_Q>1.1*RP, then the delivery week X is determined by a Master Production Schedule (MPS), and if, for a lot, Budget_Q<1.1*RP, then the delivery week X is determined by the integer I, and means is provided for setting temporary priority P as follows:
if Budget_Q<1.5*BR, then P=1,
if Budget_Q<2*BR, then P=2,
if Budget_Q<3*BR, then P=3,
if Budget_Q<4*BR, then P=4, and
if Budget_Q>4*BR, then P=5.

19. A system in accordance with claim 11 wherein:

$C_{tqR}$=required_date step Budget_Q is calculated, $C_{tqD}$=due_date step Budget_Q is calculated, and Budget_Q is calculated as the minimum of $C_{tqR}$, $C_{tqD}$, min ($C_{tqR}$, $C_{tqD}$), and means is provided for setting temporary priority P as follows:

if Budget_Q<1.5*BR, then P=1,
if Budget_Q<2*BR, then P=2,
if Budget_Q<3*BR, then P=3,
if Budget_Q<4*BR, then P=4, and
if Budget_Q>4*BR, then P=5.

20. A system for assigning priority to lots in the manufacturing of a product, wherein there is a Base Rate (BR), comprising:

means for calculating budget queue time (Budget_Q) of the lots at each step of a manufacturing plant, means for comparing the Budget_Q for a lot for a product at different stages and through the use of the budget queue time to define delivery week X, means for setting a temporary priority (P) according to Budget_Q only, and means for determining the priority of lots competing for an identical capacity, means for calculating $C_{tqR}$=required_date step Budget_Q, means for calculating $C_{tqD}$=due_date step Budget_Q, and means for calculating Budget_Q as the minimum of $C_{tqR}$, $C_{tqD}$ as min ($C_{tqR}$, $C_{tqD}$), means for determining the Remaining Process time RP of a lot, means for determining an integer I as RP/7, means for determining that if, for a lot, Budget_Q>1.1*RP, then the delivery week X is determined by a Master Production Schedule (MPS), and if, for a lot, Budget_Q<1.1*RP, then the delivery week X is determined by the integer I, setting temporary priority P as follows:
if Budget_Q<1.5*BR, then P=1,
if Budget_Q<2*BR, then P=2,
if Budget_Q<3*BR, then P=3,
if Budget_Q<4*BR, then P=4, and
if Budget_Q>4*BR, then P=5, and means for determining that if the values of delivery week X are different, then the lot with a smaller value of X gets the higher priority, and means for determining that if the values of delivery week X are equal, then the lot with a larger value of temporary priority P gets the higher priority.

* * * * *